US008171237B2

(12) United States Patent
Naaman et al.

(10) Patent No.: US 8,171,237 B2
(45) Date of Patent: May 1, 2012

(54) AUTOMATIC ASSOCIATION OF REFERENCE DATA WITH PRIMARY PROCESS DATA BASED ON TIME AND SHARED IDENTIFIER

(75) Inventors: Mor Naaman, San Francisco, CA (US); Rahul Nair, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 657 days.

(21) Appl. No.: 11/555,249

(22) Filed: Oct. 31, 2006

(65) Prior Publication Data

US 2008/0104649 A1    May 1, 2008

(51) Int. Cl.
*G06F 12/00* (2006.01)
(52) U.S. Cl. ..... 711/154; 711/100; 711/101; 348/211.1; 348/211.2; 707/705; 707/713; 707/722; 707/726; 707/727; 707/802
(58) Field of Classification Search ............ 711/100, 711/101; 348/211.1, 211.2; 707/705, 713, 707/722, 726, 727, 802
See application file for complete search history.

(56) References Cited

U.S. PATENT DOCUMENTS

| 6,038,295 | A  | * | 3/2000 | Mattes | 379/93.25 |
|---|---|---|---|---|---|
| 6,983,478 | B1 | * | 1/2006 | Grauch et al. | 725/13 |
| 7,523,132 | B2 | * | 4/2009 | Altounian et al. | 1/1 |
| 7,535,492 | B2 | * | 5/2009 | Kahn et al. | 348/211.1 |
| 7,627,152 | B2 | * | 12/2009 | Mathew et al. | 382/128 |
| 2002/0101539 | A1 | * | 8/2002 | Yokota | 348/552 |
| 2002/0147029 | A1 | * | 10/2002 | Wu | 455/558 |
| 2004/0100652 | A1 | * | 5/2004 | Cooper | 358/1.15 |

OTHER PUBLICATIONS

David Goldwasser, "A Brief Introduction to GPS Photo Linking", Jun. 15, 2004, pp. 1-5; http://www.macdevcenter.com/lpt/a/4941.
Todd Bishop, "Microsoft Notebook:Research team blends digital images and GPS", Feb. 16, 2004, pp. 1-3; http://seattlepi.nwsource/business/160723_msftnotebook16.html.
Kilika©, "TripTacker.net" Aug. 11, 2006 pp. 1-2; http://triptracker.net/about/.
Jeffrey Early, "GPS Photo Linker", Aug. 11, 2006, pp. 1-2; http://oregonstate.edu/-earlyj/gpsphotolinker/index.php. Photo 1 page http://oregonstate.edu/-earlyj/gpspphotolinker/images/batch_mode130.jpg.
Mircosoft Corporation, "Welcome to the World-Wide Media eXchange!", Apr. 7, 2005, pp. 1-2, http://wwmx.org; "World-Wide Media eXchange: FAQ" pp. 1-2, http://wwmx.org/FAQ.aspx.

(Continued)

*Primary Examiner* — Tuan Thai
*Assistant Examiner* — Zhuo Li
(74) *Attorney, Agent, or Firm* — Frommer Lawrence & Haug LLP; Jamie L. Wiegand

(57) ABSTRACT

A method and system for automatically associating primary process data with reference data. The primary process data may include image, video, audio, text, search data, and the like. The reference data may include location, temperature, pressure, and the like. A primary process data processor device, such as a digital camera, is used to acquire the primary process data with time information, but without any reference data. A reference data collector device, such as a cellular telephone, is used to acquire the reference data with time information. The primary process data and the reference data are uploaded to a server and each are associated with a shared identifier, such as a user ID. Of the content and reference data associated with the shared ID, the server determines which primary process data and reference data were acquired near the same time, and automatically associates the reference data with the primary process data.

25 Claims, 5 Drawing Sheets

OTHER PUBLICATIONS

Sony Electronics Inc. "Organize Photos by 'Where' not 'When' with Global Positioning system for Sony Digital Cameras", Aug. 1, 2006, pp. 1-2, Photo 1 page http://news.sel.sony.com/en/press_room/consumer/digital_imaging/release/23993.html; http://news.sel.sony.com/images/large/consumer/digital_imaging/map_image04_lg.jpg.

Mark Wallace, "Automatically Geotag Your Digital Photos", Aug. 3, 2006, pp. 1-2; http://www.unmediated.org/archives/2006/08/automatically_g.php.

* cited by examiner

AUTOMATIC ASSOCIATION OF REFERENCE DATA WITH PRIMARY PROCESS DATA BASED ON TIME AND SHARED IDENTIFIER

FIELD OF ART

The present invention relates generally to associating reference data with primary process data or services, and more particularly, but not exclusively, to automatically associating reference data such as location data with primary process data or services, such as images, based on a shared identifier and shared time.

BACKGROUND

A large number of people use multiple mobile devices, such as cellular phones, personal digital assistants (PDAs), global positioning system (GPS) devices, weather monitors, and the like for a wide variety of purposes. People often keep their mobile device with them wherever they go, either as hand-held devices, multi-featured watches, vehicle components, or other mobile accessories. Such mobile devices typically include the capability to acquire reference data, such as location, temperature, altitude, and the like. For example, mobile devices often include location tracking systems so that the mobile devices can be located relative to network communication nodes. Some mobile devices can obtain multiple forms of data. For example, some mobile devices include a camera, microphone, heart monitor, and/or other recording device to capture an image, a video clip, an audio clip, a measured physical characteristic, or other data that is sometimes referred to as primary process data or primary data. Some of these combination mobile devices can associate the recorded primary process data with a location at the time the primary process data is captured. Other such combination mobile devices do not have this capability.

Even if the mobile device includes a primary process data recording device, many people also use a separate primary recording device, such as a separate digital camera, video recorder, audio recorder, bar code detection recorder, weather sensor recorder, diagnostic instrument sensor recorder, and the like. The separate primary process data recording devices may have higher resolution and/or other features not provided by a combination device that incorporates a primary process data recording device into the mobile device. In addition, some people use a separate primary data recording device, because their mobile device does not include a primary process data recording device. Separate primary process data recording devices often do not include a reference data system, such as a location tracking system. However, separate primary process data recording devices often include a time tracking system, and associate a date and time with recorded primary process data. For example, many digital cameras can apply a date and time stamp to images.

Some users also wish to associate reference data, such as location information, with the captured primary process data from their separate primary process data recording device or from their mobile device that does not already have the capability to make the association. Some systems enable a user to transfer their primary process data, such as images, to a general purpose client computing device, such as a personal computer (PC), and separately transfer a log file of references data, such as reference data, to the client computing device. Using a client-based program, these client systems enable the user to individually select and manipulate primary process data to associate the primary process data with the reference data, such as reference data. However, if the user wishes to share the primary process data with other users through a network, such as through a shared photo server, the reference data (e.g., reference data) is typically lost or not recognized by the shared server when the user uploads the primary process data.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the present invention is directed towards automatically associating reference data, such as location information, with primary process data that is obtained at the time the primary process data is obtained, but with a separate device from that used to collect the reference data.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, an online social network user and/or other person using an electronic device.

Illustrative Operating Environment

Figure 1:
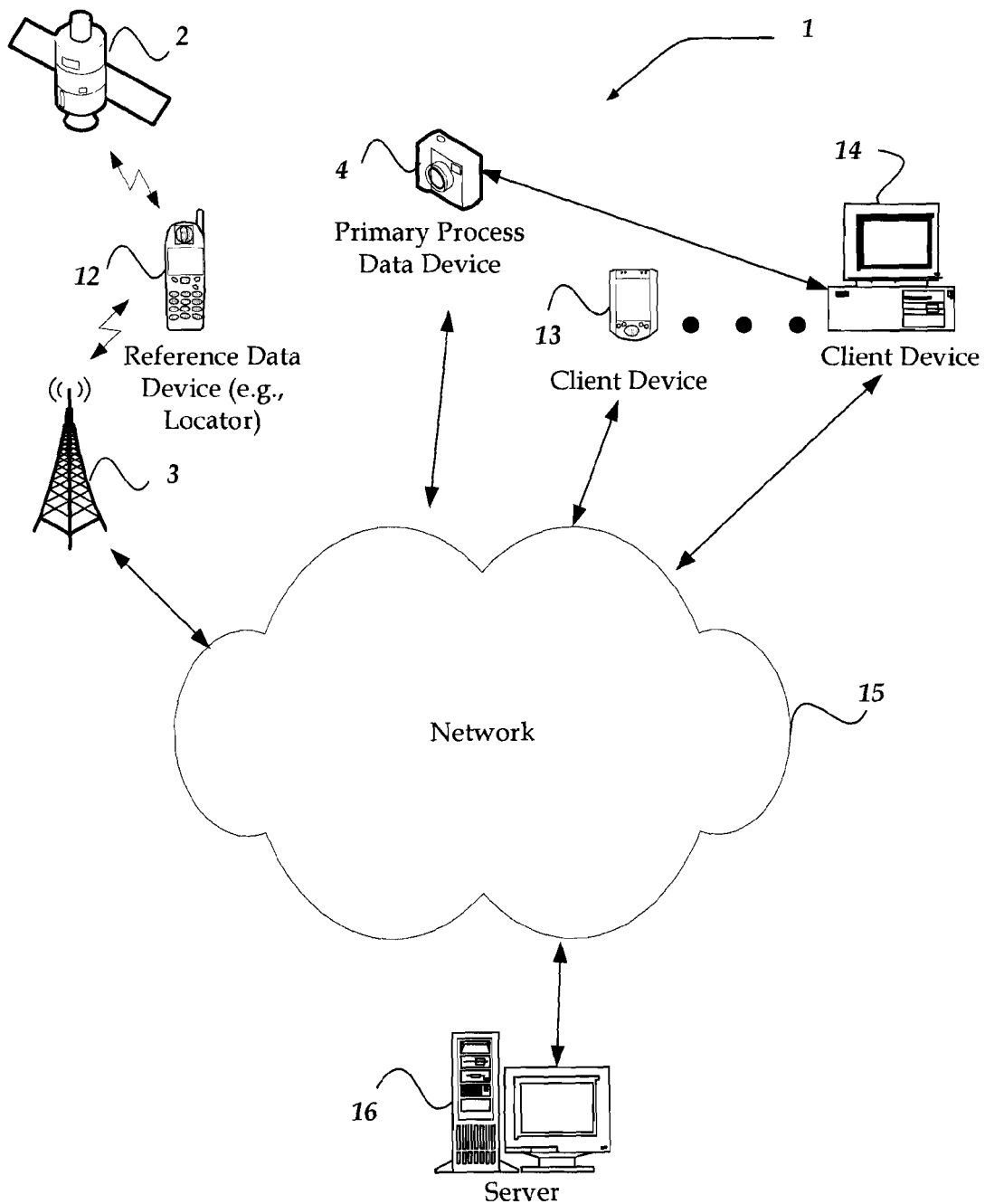
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 1 includes positioning devices 2 and 3, a primary process data device 4, client devices 12-14, a network 15, and a server 16. Network 15 is in communication with and enables communication between each of client devices 12-14, and server 16.

Reference data communication devices 2 and 3 may comprise any devices that enable reference data devices to collect and/or transfer reference data, such as location information, to primary process data device 4 and/or to server 16. For example, reference data communication device 2 may comprise a global positioning satellite that provides highly accurate latitude and longitude information to client devices and/or to server 16. As another example, reference data communication device 3 may comprise a cellular telephone tower that provides more course position information to client devices and/or to server 16. Similarly, reference data communication device 3 may comprise any other reference data unit, such as a television broadcast tower, a radio relay tower, a Wi-Fi access point, a Bluetooth™ reference device, an atmospheric monitoring station, a or other unit that can provide location, temperature, pressure, or other reference data. In another embodiment, the user may manually enter reference data, such as entering a text message with location information.

Primary process data device 4 may comprise any device that is capable of capturing data that is considered primary process data by the user. For instance, primary process data device 4 may comprise a digital camera, a digital video camera, an audio recorder, a medical monitoring or diagnostic instrument, a physical property measurement device, and the like. Captured primary process data may be recorded locally by primary process data device 4 or transmitted to a separate recording device. However, in this embodiment, primary process data device 4 generally does not associate the primary process data with reference data at the time the primary process data is captured. For example, a separate digital camera may not associate image data with location data. Similarly, a separate heart monitor may not associate pulse data with depth data obtained with a scuba diving sensor.

Client devices 12-14 may include virtually any computing device capable of receiving and sending reference data, primary process data, location information, a message, and/or other data over a network, such as network 15, to and from another computing device, such as server 16, each other, and the like. At least one client device is used as a reference data device in cooperation with primary process data device 4. The set of client devices described in an exemplary embodiment below generally includes mobile devices that are usually considered more specialized devices with limited capabilities and typically connect using a wireless communications medium such as cell phones, smart phones, pagers, walkie talkies, radio frequency (RF) devices, infrared (IR) devices, CBs, GPS devices, medical monitoring devices, physical property measuring devices, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, camera, music player, and any other device that is equipped to communicate over a wired and/or wireless communication medium. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like.

Embodiments of client devices 12-14 include a user interface that enables a user to control settings, and to instruct the client device to perform operations. Each client device also includes a communication interface that enables the client device to send and receive reference data, primary process data, and/or messages from another computing device employing the same or a different communication means, including, but not limited to SMS, MMS, IM, internet relay chat (IRC), Mardam-Bey's internet relay chat (mIRC), Jabber, email, and the like. Client devices 12-14 may be further configured with a browser application that is configured to receive and to send markup pages, web-based messages, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as Bluetooth™ or a universal serial bus (USB), other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, wireless links including satellite links, full or fractional dedicated digital lines including T1, T2, T3, and T4, Integrated Services Digital Networks (ISDNs), Digital Subscriber Lines (DSLs), or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including wireless application protocol (WAP), transmission control protocol/internet protocol (TCP/IP), hypertext transfer protocol (HTTP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Instructions may be stored or transmitted in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Figure 2:
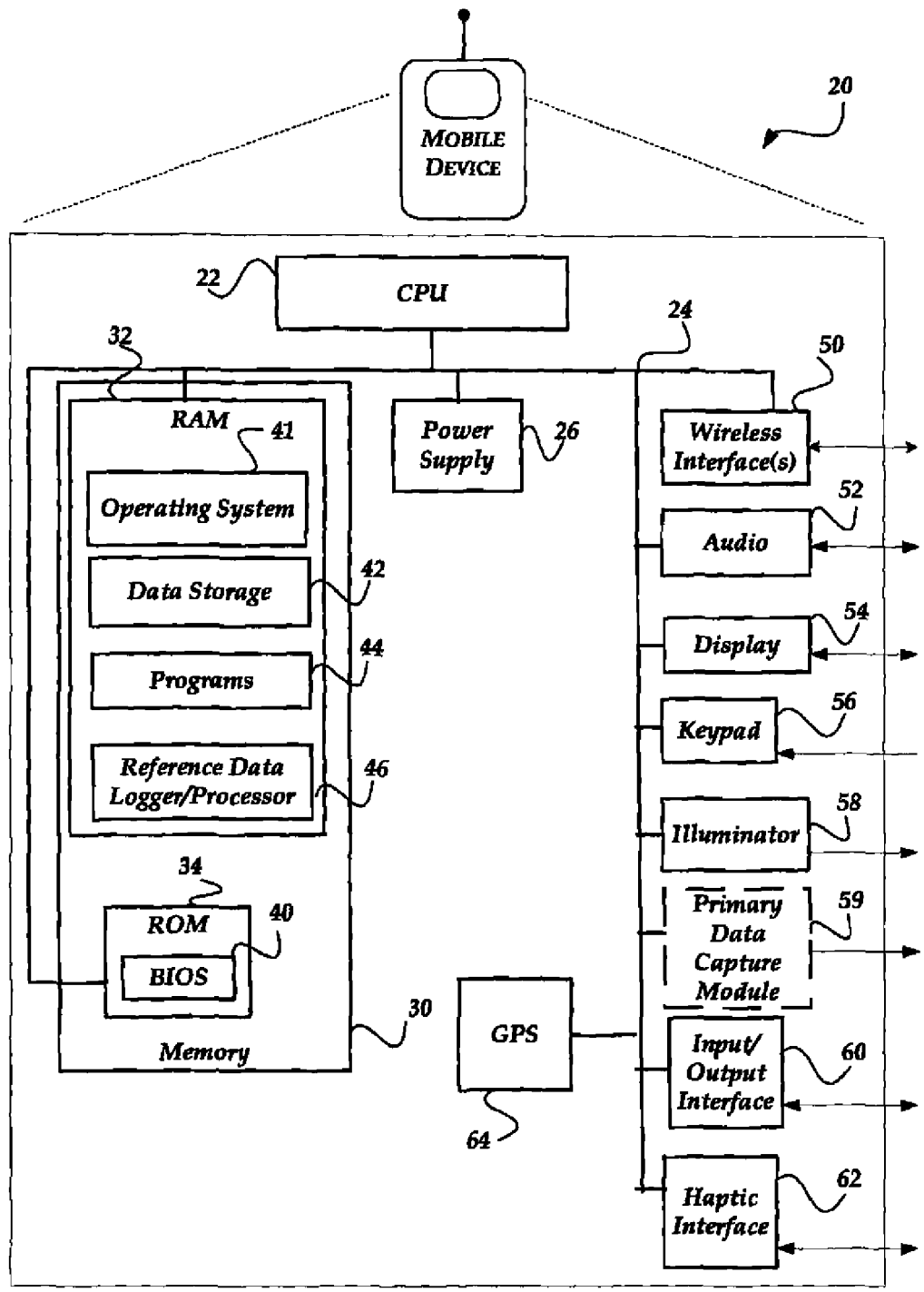
FIG. 2 shows one embodiment of a mobile reference data device that may be included in a system implementing the invention.

FIG. 2 shows an exemplary mobile device 20, according to one embodiment of the invention for use as a reference data collector device. In one embodiment, mobile device 20 is a cellular telephone that is arranged to send and receive voice communications and messages such as SMS messages via one or more wireless communication interfaces. Generally, mobile device 20 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile device 20 may also comprise other electronic devices that such as Personal Digital Assistants (PDAs), handheld computers, personal computers, multiprocessor systems, microprocessor-based or programmable consumer electronics, network PCs, wearable computers, and the like.

Mobile device 20 may include many more components than those shown in FIG. 2. However, the components shown are sufficient to disclose an illustrative embodiment for practicing the present invention. As shown in the figure, mobile device 20 includes a processing unit 22 in communication with a mass memory 30 via a bus 24.

Mass memory 30 includes a RAM 32, a ROM 34, and other storage means. Mass memory 30 illustrates another example of computer storage media for storage of information such as computer readable instructions, data structures, program modules or other data. Mass memory 30 stores a basic input/output system ("BIOS") 40 for controlling low-level operation of mobile device 20. The mass memory also stores an operating system 41 for controlling the operation of mobile device 20. It will be appreciated that this component may include a specialized mobile communication operating system such as Windows Mobile™, or the Symbian® operating system, or a general purpose operating system such as a version of Window™, UNIX, or LINUX™. The operating system may include, or interface with a Java virtual machine module that enables control of hardware components and/or operating system operations via Java application programs.

Memory 30 further includes one or more data storage units 42, which can be utilized by mobile device 20 to store, among other things, programs 44 and/or other data. Programs 44 may include computer executable instructions which, when executed by mobile device 20, transmit, receive, and/or otherwise process messages (e.g., SMS, MMS, IM, email, and/or other messages), audio, video, and enable telecommunication with another user of another mobile device. Other examples of application programs include calendars, contact managers, task managers, transcoders, database programs, word processing programs, spreadsheet programs, games, and so forth. A further example of an application program includes a browser program. The browser may include computer executable instructions, which may be run under control of operating system 41 to enable and manage requesting, receiving, and rendering markup pages such as WAP pages (sometimes referred to as WAP cards), and the like.

In addition, mass memory 30 stores a reference data logger/processor 46, which may be run under control of operating system 41 to enable and manage requesting, receiving, storing, and transmitting reference data. Reference data may include latitude and longitude data, cellular telephone tower data, wireless access point data, fixed address data, Bluetooth™ reference data, temperature data, altitude data, pressure data, manually entered reference data, and/or other data to be associated with primary process data that is not currently associated with the reference data.

Mobile device 20 also includes a power supply 26, one or more wireless interfaces 50, an audio interface 52, a display 54, a keypad 56, an illuminator 58, an input/output interface 60, a haptic interface 62, and an optional global positioning systems (GPS) receiver 64. Power supply 26 provides power to mobile device 20. A rechargeable or non-rechargeable battery may be used to provide power. The power may also be provided by an external power source, such as an AC adapter or a powered docking cradle that supplements and/or recharges a battery.

Mobile device 20 may optionally communicate with a base station, or directly with another mobile device. Wireless interface 50 includes circuitry for coupling mobile device 20 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), and the like.

Audio interface 52 is arranged to produce and/or receive audio signals such as the sound of a human voice, music, and the like. For example, audio interface 52 may be coupled to a speaker and microphone (not shown) to enable telecommunication with others and/or generate an audio acknowledgement for some action. Display 54 may be a liquid crystal display (LCD), gas plasma, light emitting diode (LED), or any other type of display used with a mobile device. Display 54 may also include a touch sensitive screen arranged to receive input from an object such as a stylus or a digit from a human hand.

Keypad 56 may comprise any input device arranged to receive input from a user. For example, keypad 56 may include a push button numeric dial, or a keyboard. Keypad 56 may also include command buttons that are associated with selecting and sending primary process data, such as images. Illuminator 58 may provide a status indication and/or provide light. Illuminator 58 may remain active for specific periods of time or in response to events. For example, when illuminator 58 is active, it may backlight the buttons on keypad 56 and stay on while the mobile device is powered. Also, illuminator 58 may backlight these buttons in various patterns when particular actions are performed, such as dialing another mobile device. Illuminator 58 may also cause light sources positioned within a transparent or translucent case of the mobile device to illuminate in response to actions. Illuminator 58 may further be used as a flash for image capture. An optional primary process data capture module 59, such as a camera, may be included in mobile device 20. If the primary process data capture module is included, the mobile device may serve as both primary process data device and a reference data device. For embodiments discussed herein, the primary process data capture module generally does not automatically associate reference data with captured primary process data.

Mobile device 20 also comprises input/output interface 60 for communicating with external devices, such as a headset, or other input or output devices not shown in FIG. 2. Input/output interface 60 can utilize one or more communication technologies, such as USB, infrared, Bluetooth™, and the like. Haptic interface 62 is arranged to provide tactile feedback to a user of the mobile device. For example, the haptic interface may be employed to vibrate mobile device 50 in a particular way when another user of a mobile device is calling.

GPS transceiver 64 can determine the physical coordinates of mobile device 20 on the surface of the Earth, which typically outputs a location as latitude and longitude values. GPS transceiver 64 can also employ other geo-positioning mechanisms, including, but not limited to, triangulation, assisted GPS (AGPS), E-OTD, CI, SAI, ETA, BSS and the like, to further determine the physical location of mobile device 20 on the surface of the Earth. It is understood that under different conditions, GPS transceiver 64 can determine a physical location within millimeters for mobile device 20; and in other cases, the determined physical location may be less precise, such as within a meter or significantly greater distances.

Mobile device 20 may communicate with a server to send reference data, to request and receive markup pages, and/or for other services. The reference data may be sent in a log file, continuously fed in real time, or transmitted by other methods.

One embodiment of a general purpose server computing device, such as a server device 70, is described in more detail below in conjunction with FIG. 3. Briefly, server device 70 may include any computing device capable of connecting to network 15 to receive and provide services and information to client devices and/or other computing devices. Server device 70 may include many more components than those shown. The components shown, however, are sufficient to disclose an illustrative embodiment for practicing the invention. Many of the components of server device 70 may also be duplicated in a higher capability client device that a mobile user may use for uploading primary or reference data, browsing web pages, and/or other computing activities, in addition to using the mobile device.

As shown in the figure, server device 70 includes a processing unit 72 in communication with a mass memory 74 via a bus 73. Mass memory 74 generally includes a RAM 76, a ROM 78, and other storage means. Mass memory 74 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 74 stores a basic input/output system ("BIOS") 80 for controlling low-level operation of server device 70. The mass memory also stores an operating system 81 for controlling the operation of server device 70. It will be appreciated that this component may include a general purpose operating system such as a version of Windows™, UNIX, LINUX™, Solaris™, or the like. The operating system may also include, or interface with a Java virtual machine module that enables control of hardware components and/or operating system operations via Java application programs.

Mass memory 74 further includes one or more data storage units 82, which can be utilized by server device 70 to store, among other things, programs 84 and/or other data. Programs 84 may include computer executable instructions which can be executed by server device 70 to implement a markup handler application, such as an HTTP handler application for transmitting, receiving, and otherwise processing HTTP communications, a WAP handler application for transmitting, receiving, and otherwise processing WAP communications, and the like. Similarly, programs 84 can include a secure socket layer (SSL) handler application for handling secure connections, such as initiating communication with an external application in a secure fashion. Other examples of application programs include content management applications for photos and/or other content, messaging applications, schedulers, calendars, web services, transcoders, database programs, word processing programs, spreadsheet programs, and so forth. Accordingly, programs 84 can process images, audio, video, or markup pages, enable telecommunication with another user of another electronic device, and/or other services.

In addition, mass memory 74 stores an identification (ID) processor 86 and a location multi data associator 88. ID processor 86 may include computer executable instructions, which may be run under control of operating system 81 to upload, register, identify, authenticate, and/or manage primary process data; register, identify authenticate, and/or control access to user data; manage billing, and/or perform other identification processes. Multi-data associator 88, maintains uploaded reference data, automatically associates reference data to primary process data, and/or performs other data-association processes.

Figure 3:
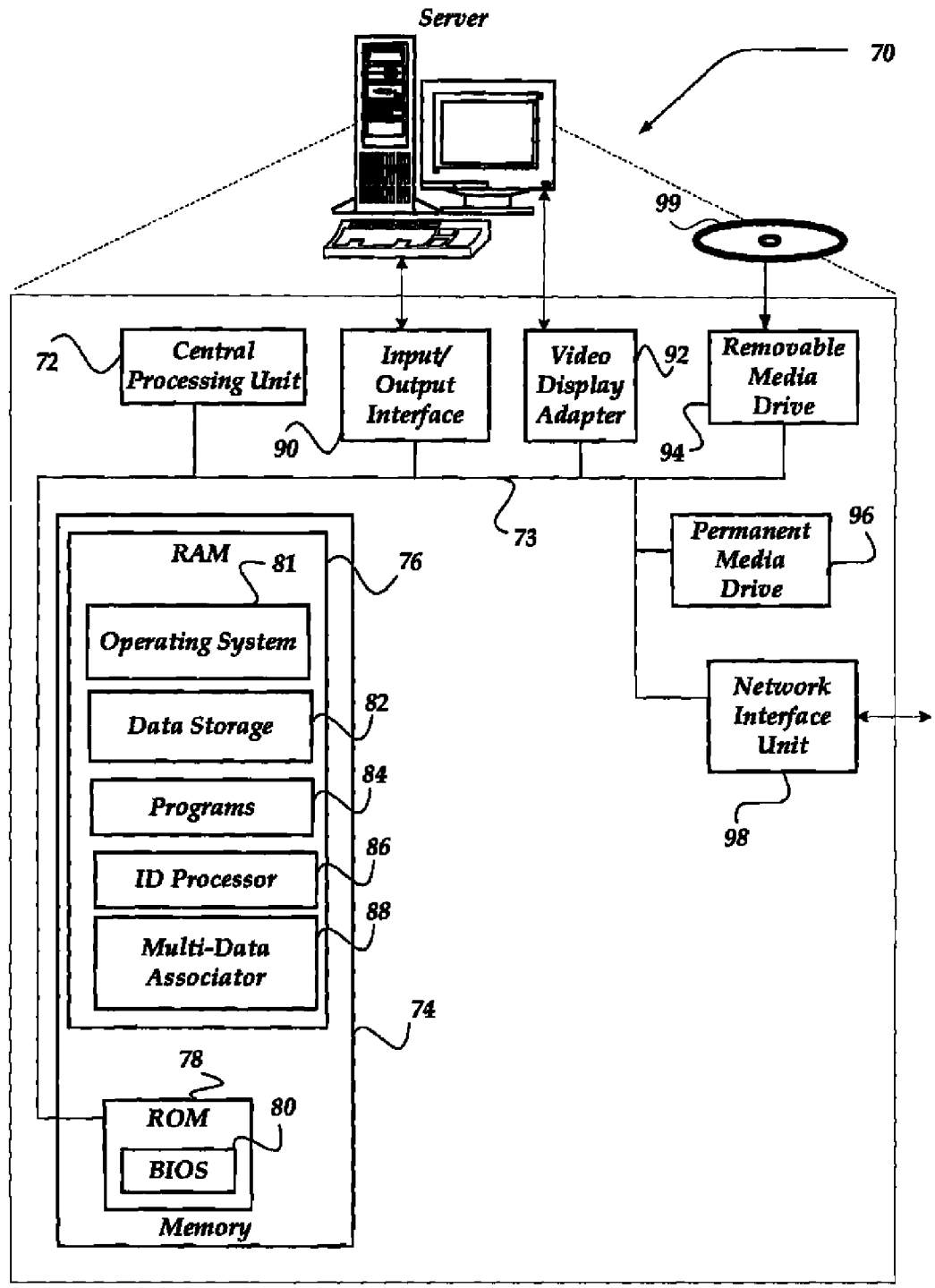
FIG. 3 shows one embodiment of a server device that may be included in a system implementing the invention.

Server device 70 also includes an input/output interface 90 for communicating with input/output devices such as a keyboard, mouse, wheel, joy stick, rocker switches, keypad, printer, scanner, and/or other input devices not specifically shown in FIG. 3. A user of server device 70 can use input/output devices to interact with a user interface that may be separate or integrated with operating system 81, programs 84, and/or other modules. Interaction with the user interface includes visual interaction via a display, and a video display adapter 92.

Server device 70 may include a removable media drive 94 and/or a permanent media drive 96 for computer-readable storage media. Removable media drive 94 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 99, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 98, server device 70 can communicate with a wide area network such as the Internet, a local area network, a wired telephone network, a cellular telephone network, or some other communications network, such as network 15 in FIG. 1. Network communication interface unit 98 is sometimes known as a transceiver, transceiving device, network interface card (NIC), and the like.

Illustrative Architecture

Figure 4:
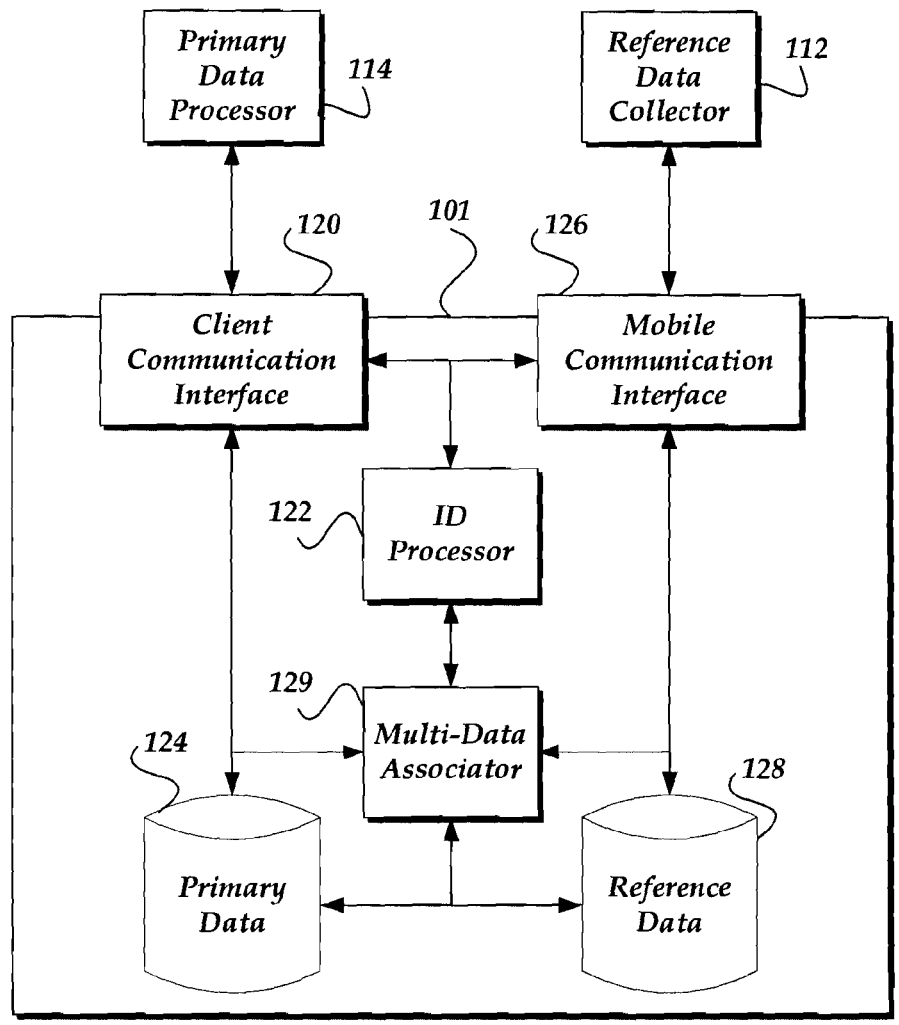
FIG. 4 illustrates a sample architecture for use in one embodiment of the invention.

FIG. 4 illustrates a sample architecture 100 for use in one embodiment of the invention. This embodiment is described in terms of capturing image data such as photos and associating the image data with separately obtained location data. However, any type of primary may be acquired and associated with any kind of reference data.

A reference data collector 112 tracks reference data. For instance, reference data collector 112 may comprise a cellular telephone that tracks and stores its location as it moves relative to cellular telephone towers. Alternatively, or in addition, a GPS transceiver tracks its latitude and longitude location. In one embodiment, reference data collector 112 keeps a log of its locations relative to time. The time may be synchronized to a centralized time data source or synchronized to a primary process data processor 114. The primary process data processor may comprise any data processing device and/or primary process data collection device. The data processor may be an online third party service, a service associated with server 101, a separate service device, a data captures device, or other processing system. In the exemplary embodiment discussed below, primary process data processor 114 comprises a data capture device.

Primary process data processing device 114 may comprise a digital media device that processes primary process data, such as digital image data, audio data, physical property measurement data, search data, and the like. Primary process data processor 114 also tracks time relative to processed or captured primary process data. The primary process data processor may also be synchronized to the centralized time data source or synchronized to reference data collector 112. The reference data collector and primary process data processor are generally used at substantially the same time, and substantially the same location, although this is not required. For example, a user can instruct a GPS device to transmit or store location data during the time, and at the location, that the user takes photos with a digital camera. Alternatively, the reference data collector and/or primary process data collection device may automatically activate when one detects the other within a predefined proximity.

In this embodiment, primary process data processor 114 is in communication with a client communication interface 120 of server 101. The primary process data processor may be in direct communication with the client communication interface, or may have indirect communication, such as through a general purpose PC, to the client communication interface. Client communication interface 120 is in communication with an ID processor 122, which authenticates a shared identifier, such as a user ID, a primary process data processor device ID, and/or another identifier associated with primary process data processor 114 and/or its user. ID processor 122 associates the user ID, primary process data processor device ID, and/or other identifier with primary process data uploaded to server 101. Client communication interface 120 is also in communication with a primary process data store 124. Uploaded primary process data from primary process data processor 114 and the associated identifier are stored by primary process data store 124. The primary process data store may be part of server 101 or accessed over a network.

In this embodiment, reference data collector 112 is in communication with a mobile communication interface 126 of server 101. The reference data collector may be in direct communication with the mobile communication interface, or may have indirect communication, such as through a cellular telephone network, to the mobile communication interface. Mobile communication interface 126 is in communication with ID processor 122, which authenticates a user ID, reference data collector device ID, and/or other identifier associated with reference data collector 112 and/or its user. The identifier is also associated with primary process data processor 114 and/or its user. The identifiers may be the same, such as the same user ID, or may be associated by a shared identifier. ID processor 122 associates the user ID, reference data collector device ID, and/or shared identifier with reference data uploaded to server 101. Mobile communication interface 126 is also in communication with a reference data store 128. Uploaded reference data from reference data collector 112 and the associated identifier are stored by reference data store 128. The reference data store may be part of server 101 or accessed over a network. The reference data store may also be combined with, or in communication with primary process data store 124.

Client communication interface 120 and/or mobile communication interface 126 are in communication with a multi-data associator 129. In this way, a general purpose computing device may communicate through client communication interface 120 to communicate with multi-data associator 129. Similarly, reference data collector 112, such as a cellular telephone, may communicate through mobile communication interface 126 to communicate with multi-data associator 129. The general purpose computing device and/or reference data collector may be used to control settings for automatic processing, initiate location commenting, make associations, and/or other interactions with multi-data associator 129. The multi-data associator is also in communication with, or combined with, ID processor 122.

Multi-data associator 129 is further in communication with primary process data store 124 and reference data store 128. When primary process data or reference data are uploaded to server 101, or upon instruction from an authorized user, multi-data associator 129 accesses and associates primary process data and reference data based on the shared identifier from ID processor 122 and based on substantially same times.

Illustrative Processes

Figure 5:
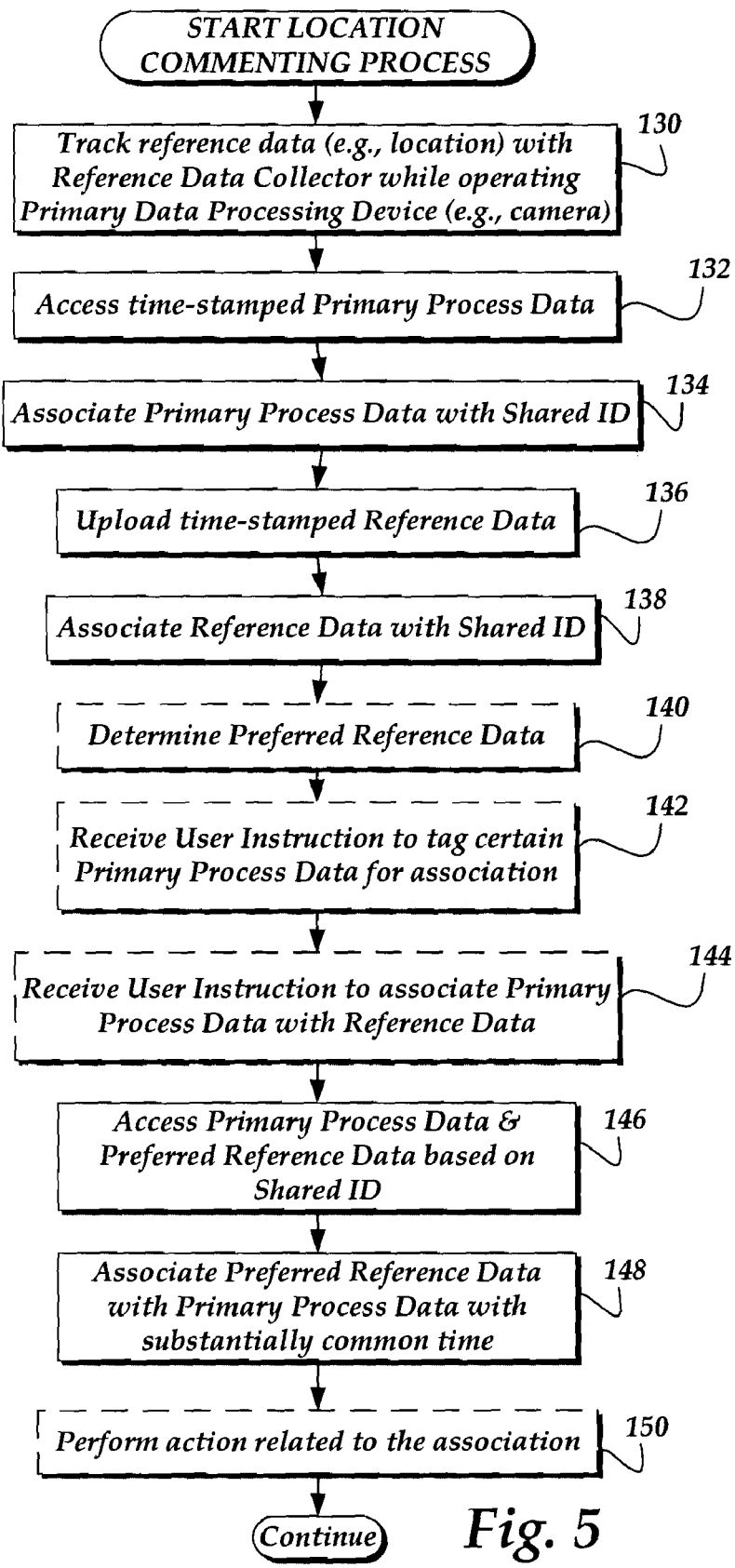
FIG. 5 illustrates logic of one embodiment for automatically associating primary process data with reference data.

FIG. 5 illustrates logic of one embodiment for automatically associating primary process data with reference data. At an operation 130, a reference data collector acquires reference data relative to date and time. The reference data collector may log reference data and/or immediately relay the reference data to the server. This embodiment will generally be discussed in terms of logging the reference data, but the invention is not limited to logging. If logging, the reference data collector may continuously log the reference data during operation or may log reference data in response to a user instruction. For example, a user may initiate a location logging module on a cellular telephone. The reference data may be logged at predefined intervals, such as time periods, distances, transitions from one cell tower to another, and/or other intervals.

While logging the reference data, a primary process data processing device performs a service, generates primary process data, and/or collects primary process data. For example, a user may take photographs with a digital camera that is a separate device from the reference data collector. In this exemplary embodiment, the primary process data processing device associates a date and time with the captured primary process data. The association may be a time stamp that is written into the primary process data, a metadata tag that is linked to the primary process data, or other association. The primary process data may take any format or form. For instance, images may be stored in a joint photographic experts group (JPEG) format, a graphic interchange format (GIF), or other format. Other embodiments may process message text data, web search data, and/or other data that is produced or accessed by a primary process data device. For example, a user may employ a laptop computer and a wireless access point to perform a web search. The wireless access point, or the user's cellular phone can provide location data, or other reference data at the time the laptop user performs a web search. The search query and/or search results may be associated with the date and time of the search, and identified as the primary process data. In real time, or at a later time, the reference data, such as location data is associated with the search data. This association may be used to immediately, or later, refine searches for that user at that location or other locations. For instance, current location data may be uploaded from the user's cell phone on a continuous basis to a search server and identified by the user ID that is also associated with the laptop and/or the current search session. The location data is used by the search service to filter, sort, and/or otherwise adjust the search process or search results to be relevant to the location data. In another example, the user may return to a prior location, such as a café with a wireless access point. The user's cell phone may again upload reference location data while the user performs a new search. Based on the prior association, a search engine may filter or sort new search data to provide the most relevant results that may be related to the location. Because of the prior association, a user may receive different results, even if entering the same search terms. Similarly, location data, temperature data, altitude data, and/or other reference data may also be used to download advertisements, perform calculations, or provide other services relevant to the location, the temperature, the altitude, the time, the shared identifier, or other characteristic.

At an operation 132, the time-stamped primary process data is uploaded to a server. In one embodiment, digital images are uploaded from a digital camera to a PC, and uploaded from the PC to an online photo service, such as Flickr™, operated by Yahoo! Inc. In other embodiments, the primary process data is uploaded directly from the primary process data processing device, such as from a cellular telephone that includes a camera but does not associate location data with captured images on the cellular phone. Upon upload, the primary process data is associated with a shared ID, at an operation 134. The shared ID may be a user ID that is used to login to the online photo service. Alternatively, the shared ID can be a user selected ID, such as a photo album ID, project ID, or other identifier. The user may specify or select the user-selected ID through a user interface, such as a web page, prior to, or after the time-stamped primary process data is uploaded. The user-selected ID may be associated with the time-stamped primary process data immediately upon uploading the time-stamped primary process data or upon a user instruction. Alternatively, the shared ID may be assigned by the server or other module. For example, the server may assign an identifier when the primary process data is uploaded from a public kiosk. The server will inform the user of the assigned ID for later association with the reference data.

Similarly, time-stamped reference data is uploaded from the reference data collector device to the server at an operation 136. As with the primary process data, in one embodiment, reference data logs are uploaded from the reference data collector to a PC, and uploaded from the PC to the online photo service. In other embodiments, one or more reference data logs are uploaded directly from the reference data collector device, such as from a cellular telephone. The reference data logs may be uploaded in response to a user instruction or without use intervention. For example, a cellular telephone may be programmed to upload reference data continuously, upon connection to the cellular network, at predefined intervals, or when requested by the server. For instance, the server may request reference data logs from a pre-registered cellular telephone when the server receives primary process data for a particular user ID. The server may automatically access the cellular telephone that is registered with the same user ID.

Upon upload of the reference data log(s), they are associated with the shared ID, at an operation 138. In one embodiment, the shared ID is the user ID. A user ID can be established independent of uploading either the primary process data or the reference data. The user ID can also be associated with the primary process data and the reference data in either order. Similarly, user selected, or automatically assigned IDs may be selected or assigned in either order of uploading the primary process data or the reference data. The user may specify or select the user selected ID through the user interface, such as a web page, prior to, or after the time-stamped reference data is uploaded. The user selected ID may be associated with the time-stamped reference data immediately upon uploading the time-stamped primary process data or upon a user instruction. Similarly, for a shared ID that was assigned by a public kiosk, the user may enter or select the assigned ID to associate the assigned ID with the uploaded reference data. Alternatively, the kiosk or server may automatically associate the assigned ID, if the reference data is uploaded through the same public kiosk. In another embodiment, the assigned ID is automatically assigned to the uploaded reference data when it is uploaded from a reference data collector device that is detected to be near the public kiosk. The proximity detection may be based on a local connection with the kiosk, such as through a Bluetooth™ communication, a wireless access point communication, or other local communication. Alternatively, the proximity detection may be based on a remote detection of the reference data collector's position relative to the kiosk.

At an optional operation 140, the server determines preferred reference data in desired units, format, and/or other characteristics. For example, detailed latitude and longitude data may be rounded off to a selected resolution. English units may be converted to metric units. The reference data may be filtered or mapped to zip codes, map grids, city block numbers, road mile-markers, or the like. The user may pre-select preferred units, format, etc. Alternatively, the server may require uploaded reference data to be converted to standardized preferred units, resolution, format, and/or the like. In another embodiment, preferred reference data may be changed while the user is later viewing the primary process data associated with the reference data.

The server may also receive a user instruction, at an optional operation 142, to tag certain primary process data for association with reference data. For example, the user may use a graphical user interface to select certain images, or all images, to be associated with reference data. In another embodiment, all primary process data is associated with all of the corresponding reference data, or at least associated with reference data that is available with corresponding time stamps. In either case, the user need not identify or select the corresponding reference data to be used for associating with the primary process data. For example, the user need not know which reference data logs are closest in time to the primary process data.

At an optional operation 144, the server may receive an instruction from the user to initiate location commenting of the primary process data. For example, the user may initiate commenting after selecting certain images. Alternatively, the user may simply switch an option to apply reference data to the primary process data. Even in these embodiments that involve user initiation, the reference data is automatically associated with the primary process data without requiring the user to evaluate the time relationship, or otherwise determine which reference data should be applied to the primary process data. In another embodiment, the commenting process is initiated immediately upon uploading primary process data or immediately upon uploading reference data.

The server, or other multi-data associator module, accesses the primary process data and the preferred reference data at an operation 146, based on the shared ID. At an operation 148, the server determines which primary process data was captured at, or near the same time as the reference data was acquired. The time stamps of selected primary process data may be used to determine the corresponding reference data. Conversely, time stamps of selected reference data may be used to determine the corresponding primary process data. For example, the user may have entered or selected an area, such as on an interactive map, to initiate association of all image data that was captured within that selected area. Alternatively, a selected time period can be used to determine both primary process data and reference data that fall within the selected time period.

The server, or other multi-data associator, associates the similarly-timed primary process data and reference data at an operation 148. The association may result in establishing a pointer between the primary process data and the corresponding reference data, moving primary process data and reference data to a combined database, and/or other association technique. The association may include a process of adding reference data or modifying the primary process data with reference data. For example, the multi-data associator may tag the primary process data with reference data, such as by adding the reference data to a beginning or end of the primary process data. In another embodiment, the multi-data associator embeds reference data within the primary process data, such as by inserting alphanumeric, barcode, or other characters into image data to represent the location.

At an optional operation 150, the server may perform any other action related to the association. For example, the server may download customize its service relevant to the location of a laptop using a wireless access point. The wireless access point provides a third party server with a network address to reach the laptop, but the wireless access point does not necessarily provide a physical location to the third party server. The server may use location data uploaded from the laptop user's cellular phone to customize the third party service to that user, so the service is more relevant to the laptop user's current location. As discussed above, the server may download advertisements to the laptop that are more relevant to the physical location. The server may create sorting parameters or a filter to be applied to current or future web searches through the laptop, so that results are more relevant to the location. The server may provide location-specific information to a game running on the laptop. Medical information may be determined from reference altitude data and primary heart rate data. A public kiosk may provide custom data to a user that enters the shared identifier, based on the association. Any other action can be performed that utilizes the primary process data and the separately-acquired reference data.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for associating primary process data with reference data over a network, comprising:
    employing a server device to access primary process data that is provided by a primary process data device and that is associated with a first time that comprises a time at which the primary process data was obtained;
    employing the server device to access reference data that is provided by a reference data collector device and that is associated with a second time that comprises a time at which the reference data was obtained and is substantially near the first time, wherein the reference data is unassociated with the primary process data upon access of the primary process data;
    employing the server device to associate the primary process data with a shared identifier;
    employing the server device to associate the reference data with the shared identifier;
    employing the server device to automatically associate the primary process data with the reference data based at least in part on the shared identifier, the first time, and the second time; and
    modifying the primary process data to include at least a portion of the reference data, wherein the primary process data includes a search query, the reference data represents a location substantially near where the search query was submitted, and modifying the primary process data to include at least a portion of the reference data comprises adjusting search results of the search query based on the location substantially near where the search query was submitted, and further the primary process data device is separate from the reference data collection device.

2. The method of claim 1, wherein the reference data represents a location substantially near where the primary process data was obtained.

3. The method of claim 1, wherein the primary process data was obtained with a content acquisition device that is limited by one of the following:
    the content acquisition device does not include a reference data collector for determining the reference data; and
    the content acquisition device does not perform the operation of associating the primary process data with the reference data.

4. The method of claim 1, wherein the primary process data comprises at least one of the following: image data, video data, audio data, text data, physical measurement data, and search data.

5. The method of claim 1, wherein the reference data comprises at least one of the following: global positioning data, latitude data, longitude data, cellular tower reference data, temperature data, altitude data, and physically measured data.

6. The method of claim 1, wherein the shared identifier comprises one of the following: a user identifier, a mobile device identifier, a user-specified identifier, and a machine-specified identifier.

7. The method of claim 1, wherein:
the primary process data is automatically associated with the shared identifier when the primary process data is received at a network server; and
the reference data is automatically associated with the shared identifier when the reference data is received at the network server.

8. The method of claim 1, wherein the association is done asynchronously.

9. The method of claim 1, further comprising performing an action based at least in part on the association between the primary process data and the reference data.

10. The method of claim 9, wherein the action comprises modifying a service associated with the shared identifier, the service being accessible by a device separate from a reference data device.

11. A computer readable storage medium, comprising executable instructions for performing actions, including the actions of claim 1.

12. The method of claim 1, wherein one of the primary process data device and the reference data collector device automatically activate when detecting the other of the primary process data device and the reference data collector device.

13. The method of claim 1, wherein modifying the primary process data to include at least a portion of the reference data includes adding reference data to a beginning or an end of the primary process data.

14. The method of claim 1, wherein modifying the primary process data to include at least a portion of the reference data includes embedding reference data within the primary process data.

15. The method of claim 14, wherein the primary process data includes image data, and wherein embedding reference data within the image data includes inserting alphanumeric or barcode characters representing the reference data into the image data.

16. A server for associating primary process data with reference data over a network, comprising:
a processor;
a communication interface in communication with the processor,
a primary process data processor device that obtains primary process data, and
a reference data collector device that continually obtains reference data; and
a memory in communication with the processor and storing machine instructions that cause the processor to perform a plurality of operations, including:
accessing primary process data that is provided by the primary process data processor device and that is associated with a first time that comprises a time at which the primary process data was obtained with the primary process data processor;
accessing reference data that is provided by the reference data collector device and that is associated with a second time that comprises a time at which the reference data was obtained with the reference data collector and is substantially near the first time, wherein the reference data is unassociated with the primary process data upon access of the primary process data, and wherein the reference data is continuously received from the reference data collector;
associating the primary process data with a shared identifier;
associating the reference data with the shared identifier;
automatically associating the primary process data with the reference data based at least in part on the shared identifier, the first time, and the second time; and
modifying the primary process data to include at least a portion of the reference data, wherein the primary process data includes a search query, the reference data represents a location substantially near where the search query was submitted, and modifying the primary process data to include at least a portion of the reference data comprises adjusting search results of the search query based on the location substantially near where the search query was submitted, and further the primary process data processor device is separate from the reference data collection device.

17. The server of claim 16 wherein the reference data identifies a location substantially near where the primary process data was obtained.

18. The server of claim 16, wherein the communication interface receives the primary process data from a primary process data processor that is limited by one of the following:
the primary process data processor does not include a reference data collector for determining the reference data; and
the primary process data processor does not perform the operation of associating the primary process data with the reference data.

19. The server of claim 16, wherein the primary process data comprises at least one of the following: image data, video data, audio data, text data, physical measurement data, and search query data.

20. The server of claim 16, wherein the reference data comprises at least one of the following: global positioning data, latitude data, longitude data, cellular tower reference data, wireless access point reference data, television broadcast reference data, radio broadcast reference data, Bluetooth™ reference data, and manually entered reference data.

21. The server of claim 16, wherein the shared identifier comprises one of the following: a user identifier, a mobile device identifier, a user-specified identifier, and a machine-specified identifier.

22. The server of claim 16, wherein:
the primary process data is automatically associated with the shared identifier when the primary process data is received at the communication interface; and
the reference data is automatically associated with the shared identifier when the reference data is received at the communication interface.

23. The server of claim 16, wherein the primary process data and the reference data are received from a mobile device.

24. A system for associating primary process data with reference data over a network, comprising:
a collector device that obtains primary process data at a first time;
a reference data collector device that obtains reference data at a second time that is substantially near the first time, wherein the reference data is unassociated with the primary process data upon obtaining the primary process data; and
a multi-data associator device that:
accesses primary process' data provided by the collector device;
associates the accessed primary process data with a shared identifier;
accesses reference data provided by the reference data collector device;
associates the accessed reference data with the shared identifier;

automatically associates the primary process data with the reference data based at least in part on the shared identifier, the first time, and the second time; and modifies the primary process data to include at least a portion of the reference data, wherein the primary process data includes a search query, the reference data represents a location substantially near where the search query was submitted, and modifying the primary process data to include at least a portion of the reference data comprises adjusting search results of the search query based on the location substantially near where the search query was submitted, and further the primary process data is from a device that is separate from the reference data collection device.

25. The system of claim 24, wherein the reference data identifies a location substantially near where the primary process data was obtained.

* * * * *

UNITED STATES PATENT AND TRADEMARK OFFICE
CERTIFICATE OF CORRECTION

PATENT NO. : 8,171,237 B2  Page 1 of 1
APPLICATION NO. : 11/555249
DATED : May 1, 2012
INVENTOR(S) : Mor Naaman et al.

It is certified that error appears in the above-identified patent and that said Letters Patent is hereby corrected as shown below:

On the cover page, item (56), under (Other Publications), in column 2, line 6, delete ""TripTacker.net"" and insert -- "TripTracker.net" --, therefor.

On the cover page, item (56), under (Other Publications), in column 2, line 12, delete "Mircosoft" and insert -- Microsoft --, therefor.

In column 16, line 60, in Claim 24, delete "process'data" and insert -- process data --, therefor.

Signed and Sealed this
Tenth Day of July, 2012

David J. Kappos
*Director of the United States Patent and Trademark Office*